Dec. 19, 1933.  B. B. HOLMES  1,939,775
AUTOMATIC STEERING MECHANISM
Filed June 27, 1929   6 Sheets-Sheet 1
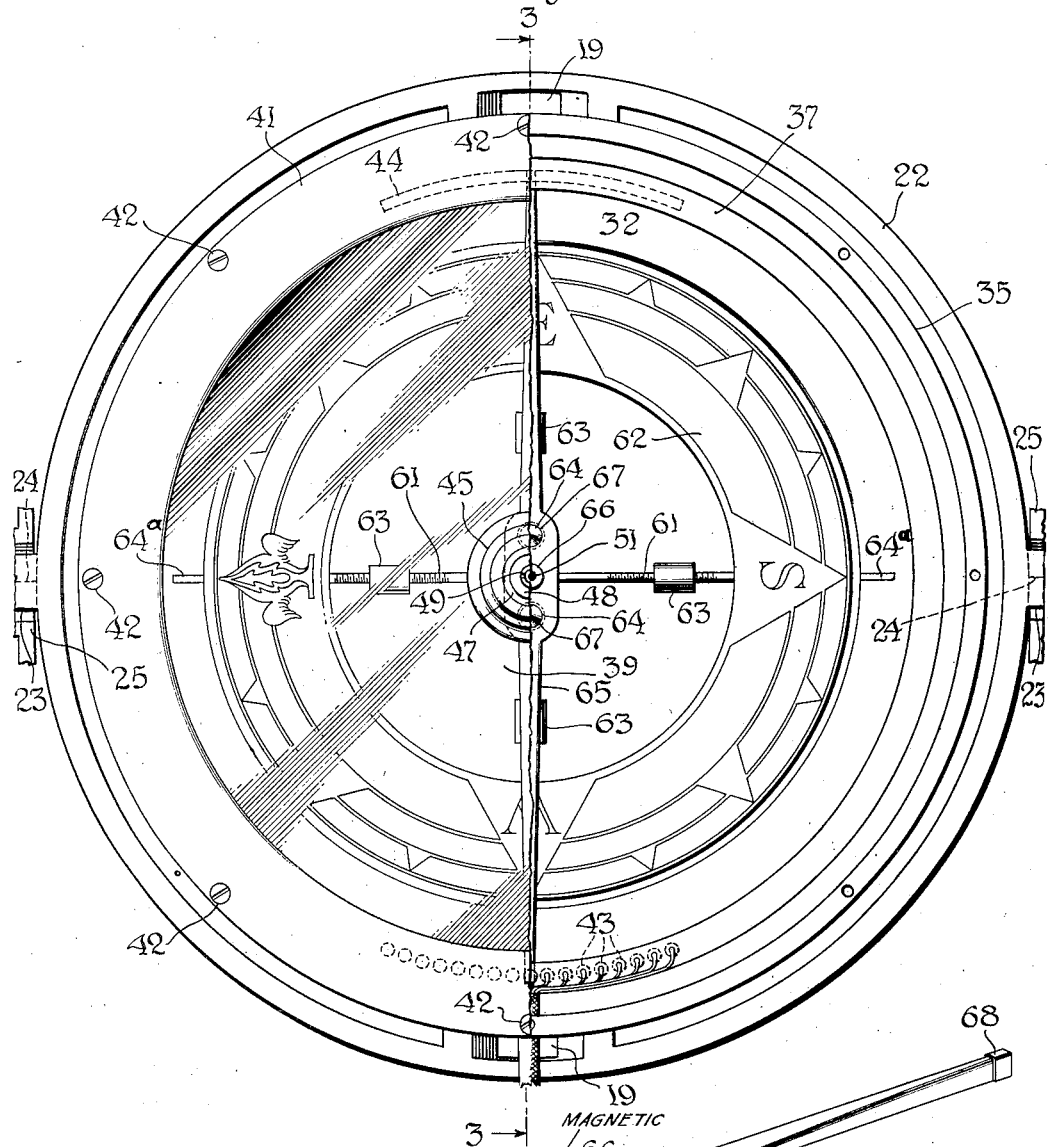
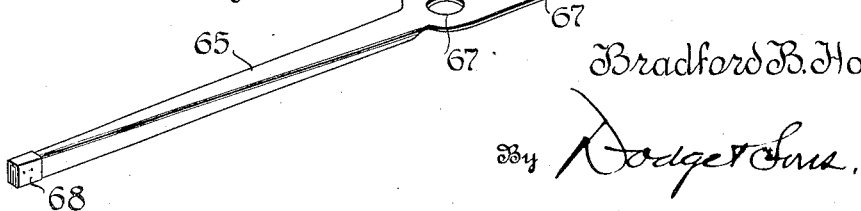
Inventor:
Bradford B. Holmes.
By Dodge & Sons,
Attorneys.

Dec. 19, 1933.  B. B. HOLMES  1,939,775
AUTOMATIC STEERING MECHANISM
Filed June 27, 1929    6 Sheets-Sheet 2

Inventor:
Bradford B. Holmes,
By Dodge & Sons,
Attorneys.

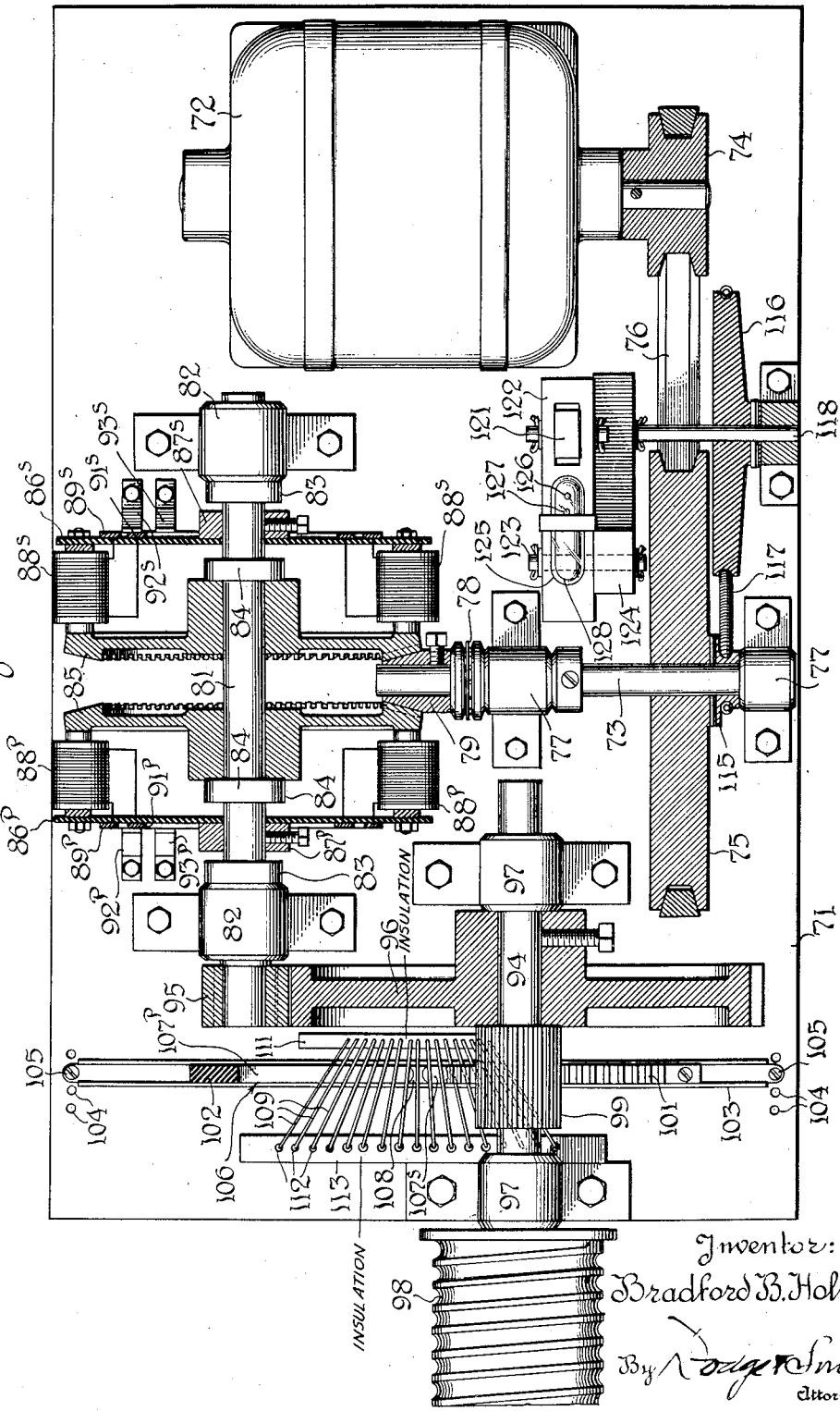

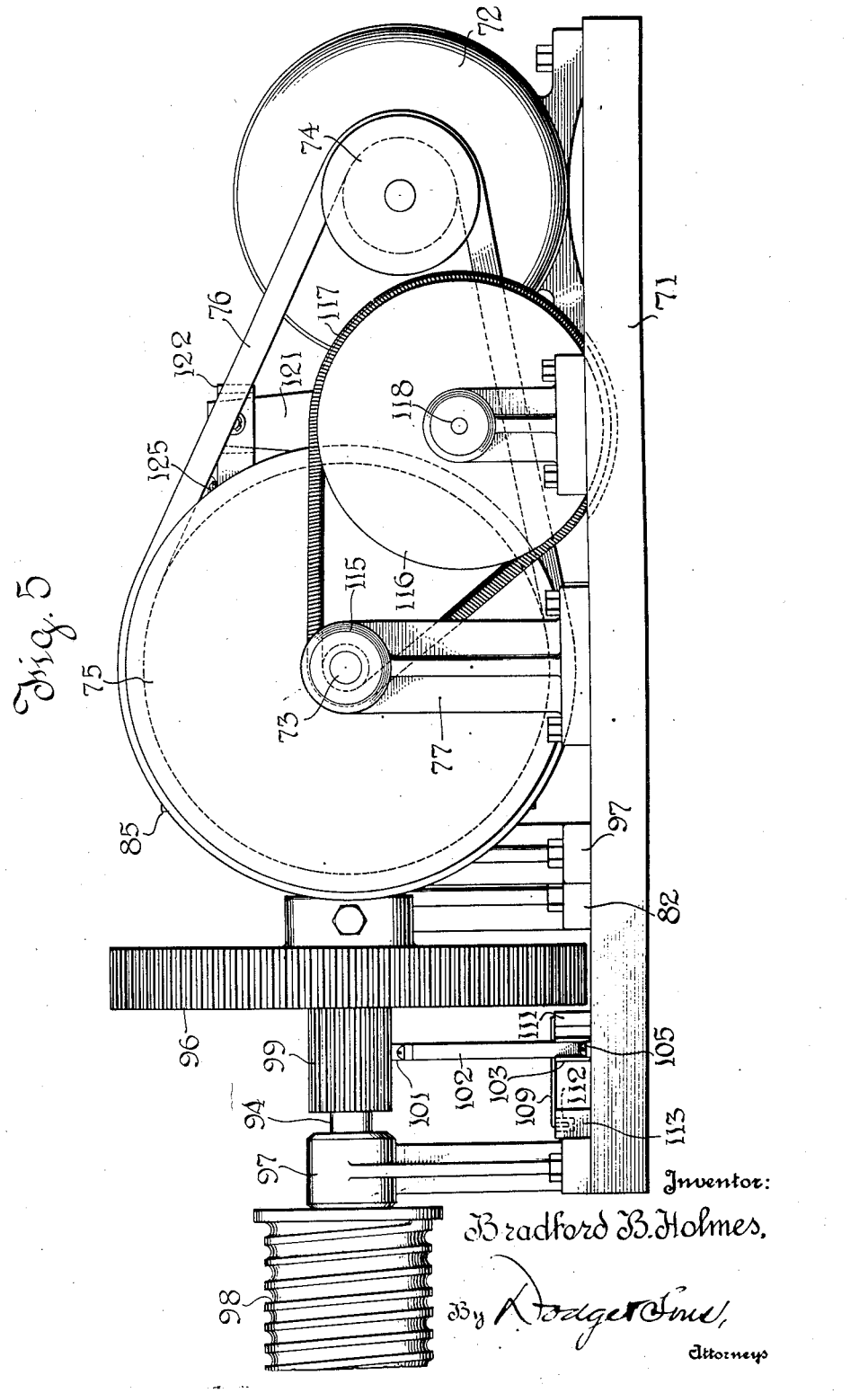

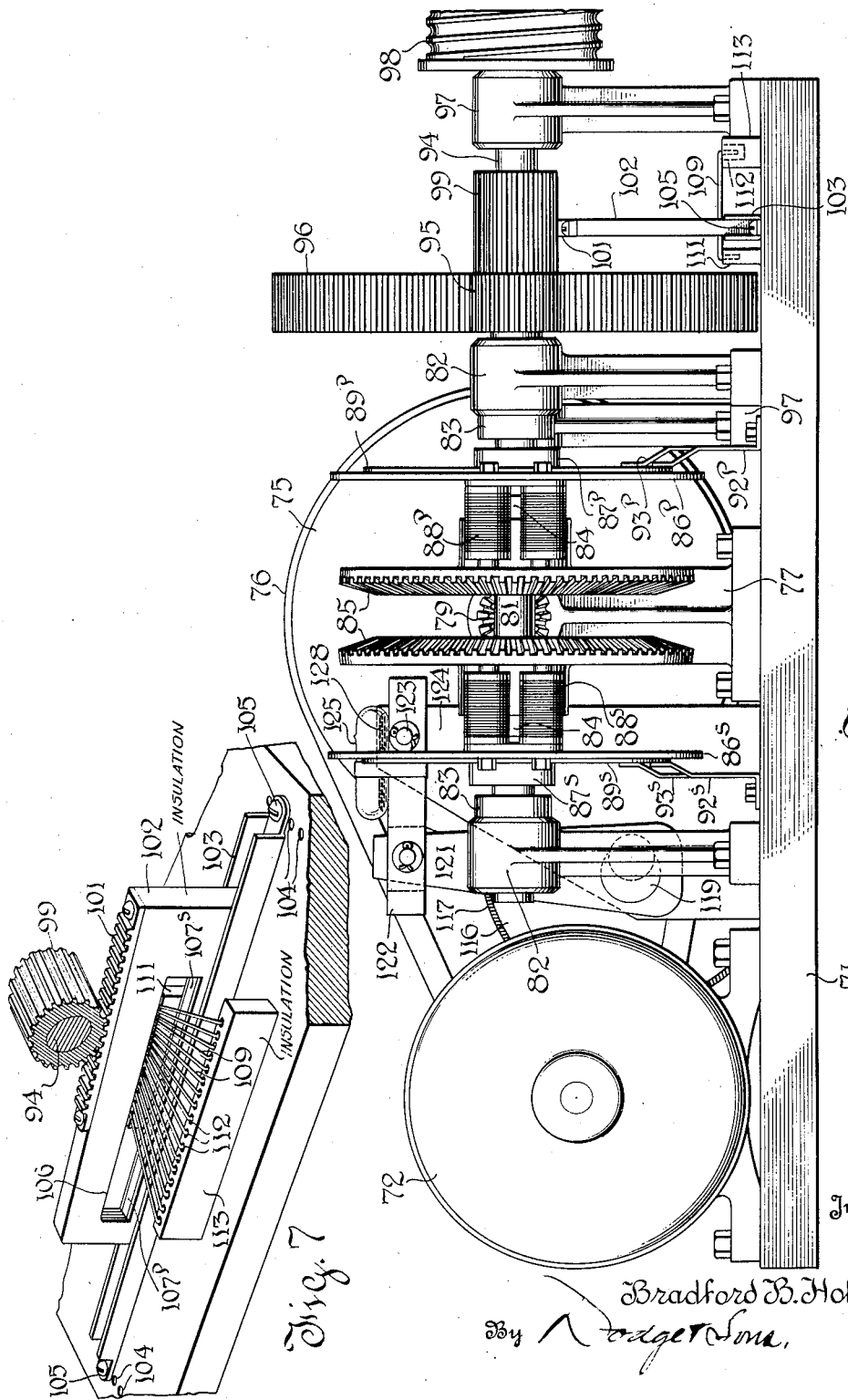

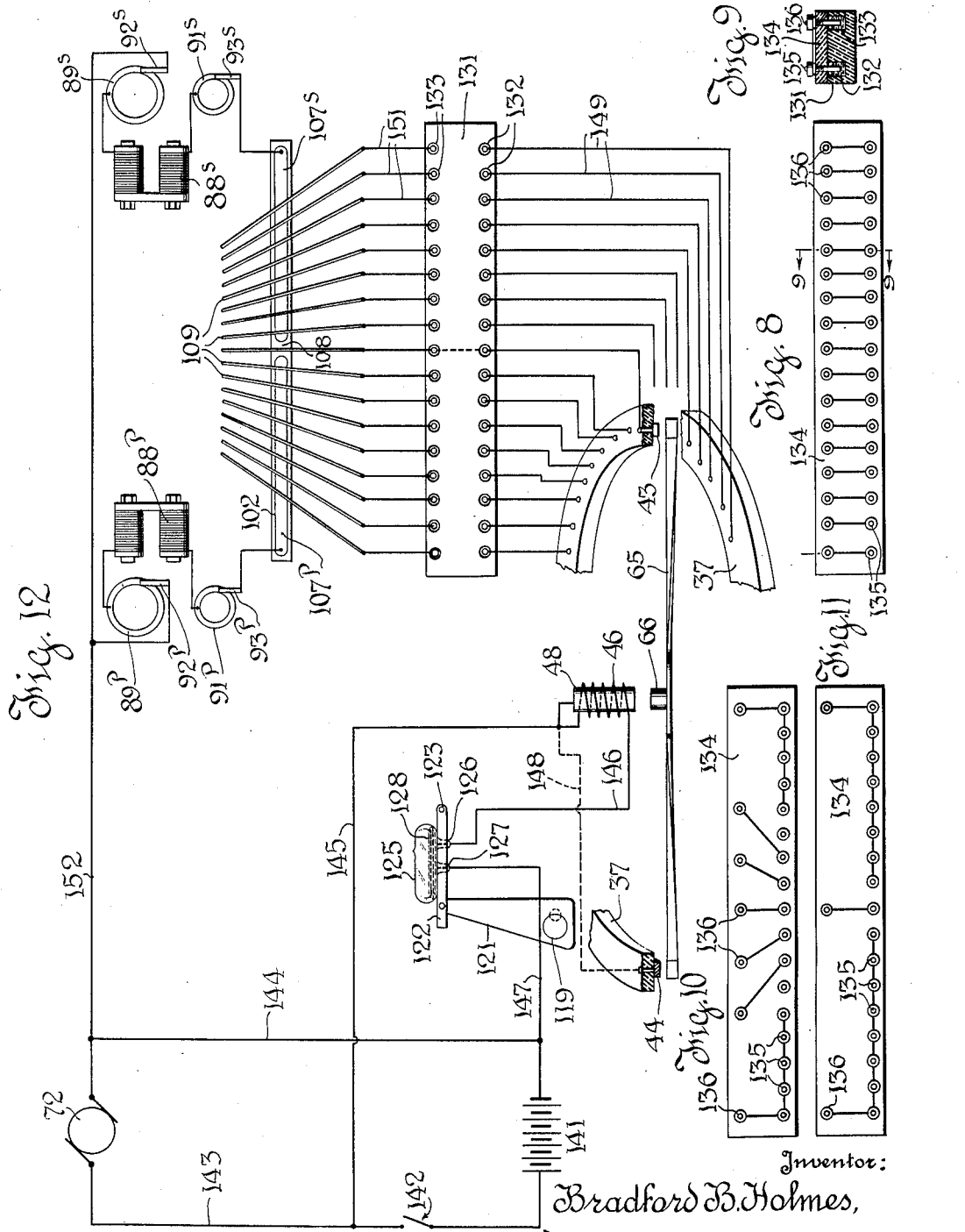

Patented Dec. 19, 1933

1,939,775

UNITED STATES PATENT OFFICE 1,939,775

AUTOMATIC STEERING MECHANISM

Bradford B. Holmes, Stonington, Conn., assignor to Ruth V. Holmes, Stonington, Conn.

Application June 27, 1929. Serial No. 374,098

24 Claims. (Cl. 200—56)

REISSUED

This invention relates to steering mechanisms and particularly to automatic means for steering ships, aircraft, land-vehicles, or any other dirigible vehicle or device, on definite courses, controlled by a direction indicating device, such as a magnetic compass, gyro-compass, or other instrument having a directional characteristic.

For purposes of illustration the invention will be described as embodied in a steering device for motorboats, in which the directional control is exercised by a magnetic compass.

The important features of the invention reside in means for transmitting the indications of a delicate and unstable indicating member, such as a compass card or needle, without interference with its directional characteristic; construction of a steering engine capable of responding quantitatively to the indications thus transmitted; adjustment of the degree of response of the steering engine, so that this may harmonize with the steering characteristics of the particular boat or other dirigible device; and ready adjustment of the character of response of the steering engine, to conform to existing disturbing conditions (for example, in steering a ship the height and direction of the waves).

The preferred embodiment of the invention for the particular stated field of use, is illustrated in the accompanying drawings, in which Fig. 1 is a plan view of a magnetic compass embodying features of the invention. In the right hand portion the glass and retaining ring are broken away.

Fig. 2 is a perspective view of the selective contactor used with such compass.

Fig. 4 is a plan view, partly in section, showing the steering engine.

Fig. 5 is a side elevation thereof.

Fig. 6 is the opposite side elevation thereof.

Fig. 7 is a perspective view of the adjustable follow-up switch forming part of the steering engine.

Fig. 8 is a plan of the switch for determining the character of steering (showing arrangement for calm weather).

Fig. 9 is a section on the line 9—9 of Fig. 8.
Fig. 10 is a view similar to Fig. 8, showing a contactor plate for a rough sea, in place.

Fig. 11 is a view similar to Fig. 8 showing a contactor plate for a heavy following sea, in place.

Fig. 12 is a wiring diagram of the complete system. In this view the switch which deter- mines the character of steering is shown with the contactor plate removed.

Figure 3:
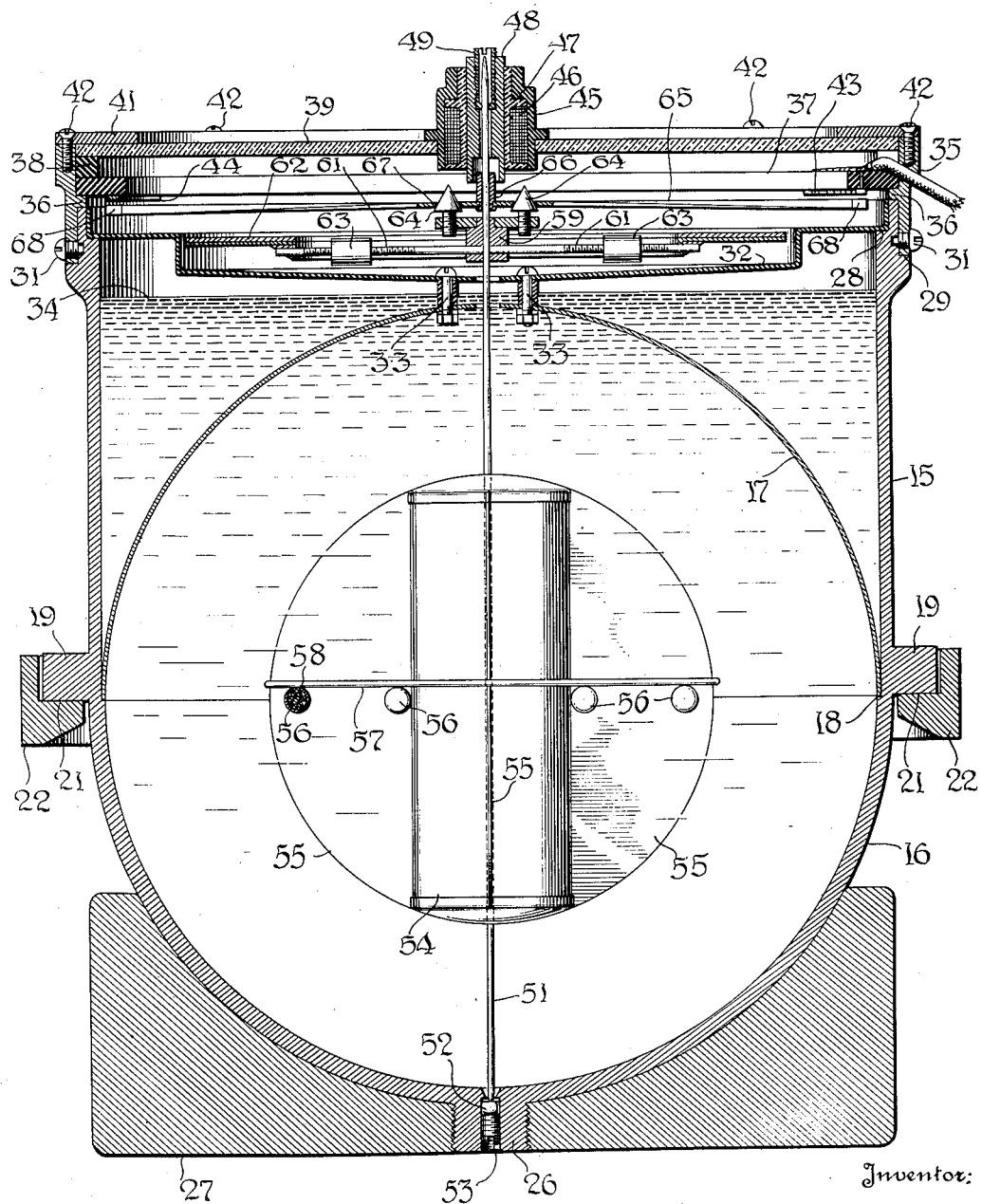
Fig. 3 is a vertical axial section through the compass on the line 3—3 of Fig. 1.

The compass case comprises a cylindrical shell 15 and a hemispherical bottom 16, preferably formed in one piece, as shown. A thin hemispherical shell 17 of the same internal radius as the bottom 16 is mounted in the case and rests on a shoulder 18, so as to form a spherical chamber. The compass is as usual provided with a gimbal mounting, so arranged that the tilting motion of the compass is about a geometrical point. It is a feature of the present invention that the center of the spherical chamber coincides with this point. The purpose of this arrangement is to reduce the tendency of the contained motion damping liquid to rotate in sympathy with certain rolling motions commonly encountered with boats.

Any gimbal mounting which will secure the desired geometrical arrangement might be used, but I show two diametrically opposed trunnions 19 having alined knife edges 21 which rest in seats in a gimbal ring 22. The imaginary line common to the two knife edges 21 passes through the geometrical center of the spherical chamber. The ring 22 carries diametrically opposed trunnions 23 displaced 90° from the trunnions 19 and having knife edges 24 supported in seats 25 in a binnacle or the like (not shown). In this case also the imaginary line common to the two knife edges 24 passes through the center of the spherical chamber.

The bottom 16 has a threaded projecting nipple 26 on which is screwed the weight 27 used to lower the center of mass of the compass case, bringing this below the center of tilt and ensuring that the compass as a whole is in stable equilibrium when the axis of the cylindrical portion of the case is vertical.

The upper margin of the cylindrical shell 15 is provided with an internal shoulder 28, an external shoulder 29 and above the latter a groove to receive retaining screws 31 which hold the covering in place but leave it free to swivel.

The shoulder 28 supports and centers a dished baffle plate 32, whose form is clearly shown in the drawings, and which is connected with the top of shell 17 by any suitable means such as the bolts and spacing bushings indicated at 33. The baffle plate 32 and shell 17 thus form a self-sustaining unit, and the plate 32 conceals and baffles the damping liquid with which the compass is filled up to a line 34 above the crown of shell 17 and below the baffle plate.

Swiveled on the upper margin of shell 15 is a ring 35. This is supported partly by shoulder 29 and partly by the internal flange 36. It is retained by the screws 31 which are threaded through it and have reduced ends entering the groove above described.

Resting on flange 36 is an annulus 37 of dielectric material of good mechanical strength, which projects inward a substantial distance from ring 35. Supported on annulus 37 with an intervening gasket 38 of rubber or the like, is the cover glass 39, clamped by a retaining ring 41. This is removably attached to ring 35 by screws 42 and holds the parts tightly in assembled relation.

The annulus 37 carries at one side a series of contacts 43 (seventeen are shown) insulated and slightly spaced from each other, and carries diametrically opposite an arcuate member 44 which subtends an angle substantially equal to that subtended by the series of contacts 43. The member 44 preferably acts merely as a stop for the shiftable contactor, but may, if desired, serve as a master contact, according to the mode of connection.

The glass 39 has an aperture which exactly centers relatively to the vertical axis of the compass case, a combined pivot-bearing, electro-magnet and (in the preferred arrangement) master contact. The external shell 45 is supported by a flange which overlies the glass, as shown, and encloses a winding 46 on insulating spool 47. Spool 47 surrounds and sustains a magnetic core 48 which has a central axial aperture for the pivot-rod of the compass. The core 48 is counterbored at its lower end, as shown, and at its upper end receives a pivot bearing 49 which is screwed into place.

The pivot rod 51 turns at its upper end in bearing 49 and extends thence downward through alined openings in baffle 32 and shell 17 to a jewel pivot bearing 52 at the bottom of the compass shell. This is retained and the opening in which it is mounted is sealed by a screw plug 53.

The geometrical axis of rod 51 coincides with the axis of portion 15 and hence passes through the center of the spherical chamber. The rod 51 carries, axially centered on it, and centered on the center of the spherical chamber, a hollow cylindrical float 54 and a number of spaced radial vanes 55. Four vanes are shown, and in the preferred arrangement shown the heads of the float are spherical and of the same radius as the arcuate margins of the vanes. The idea is to produce a perfectly balanced structure and to preserve a uniform layer of undisturbed liquid between the float-and-vane elements and the walls of the spherical chamber (see Fig. 3). The size of the float depends on the liquid used and the weight of the moving part of the compass. Many liquids suitable for use in compasses are known, and various ones may be used. The purpose of the float is to carry practically the entire weight of the moving parts and thus relieve bearing 52 of load and consequent friction.

Passing through and supported by two of the vanes 55 are tubes 56 closed at their ends. These are further sustained by a circular girth wire 57. The tubes 56 four in number, in the example illustrated, carry the bundles of magnetic needles 58, which give the compass its directional characteristic.

Above the baffle 32, the rod 51 carries a hub 59, having four radial spokes 61 which support the annular compass card 62. Each spoke is threaded and carries an adjustable weight 63, used to put the moving system into perfect balance. The direction markings may appear on the card in any usual form, a familiar marking being illustrated in Fig. 1. The lubber lines 64a are marked on baffle 32.

The hub 59 carries two alining cones 64, which are threaded into the hub so as to be independently vertically adjustable. They serve to maintain and correct the alinement of a light (preferably aluminum) contactor bow 65, which is vertically guided on rod 51 by means of a combined hub and armature 66. The bow 65 has alining apertures 67 to coact with the cones and extends at right angles to the north and south seeking magnets 58 of the compass when the bow is alined by the cones. This position is important as it avoids disturbances of the compass by the field surrounding the bow when current flows.

The bow 65 is of sheet material and quite flexible at its middle, but is stiffened at its ends by bending it into channel form (see Fig. 2). The ends carry contactors 68 which, when the bow is drawn up by the excitation of winding 46, engage respectively one of the contacts 43 and the member 44. Extensive and successful use has been made of a compass in which member 44 serves as the master contact, but there is advantage in using the core 48 as the master contact and causing the bow 65 to be flexed before armature 66 engages core 48, because the spring action of the bow gives a quick break when the winding 46 is deenergized.

The parts are so proportioned and adjusted that bow 65 rises clear of the cones 64 before its ends engage at 43 and 44, and after such engagement sufficient clearance is afforded between the bow and cones as is necessary for such movements of the compass card as will occur. This involves a proper coordination of the clearance with the periods of energization of winding 46, and with the response of the ship to rudder and waves as will be later explained.

While a compass of the type above described or one embodying certain of its novel features, may be used to control various steering engines, the best results have been so far secured with a steering engine having a constantly running motor, and two relatively reverse drives each including a normally disengaged magnetic clutch, which clutches are selectively energized under the control of the compass, so that the motor then operates the steering gear in one or the other direction. Such an engine is illustrated in Figs. 4 to 7 inclusive. While no claim is made herein to the specific steering engine structure, it has been illustrated and described in order to make it clear how the contact device operates.

The apparatus is supported as a unit on a base 71. Power is derived from a constantly-running electric motor 72, which typifies any source of mechanical power.

The motor drives a shaft 73 at reduced speed by means of grooved pulleys 74 and 75 and V-belt 76. Shaft 73 is supported by bearings 77 and thrust bearing 78 and carries fixed to it a bevel pinion 79.

In plane with the shaft 73 and at right angles thereto, is a shaft 81, mounted in bearings 82. This shaft is held against longitudinal motion by collars 83 fast on the shaft, and carries, fixed to it, two other collars 84 between which are assembled two opposed bevel gears 85, each loose on the shaft. The gears 85 mesh with opposite sides of pinion 79, and since this is constantly running the gears 85 turn constantly in opposite directions.

The gears 85 may be clutched selectively to shaft 81 by magnetic clutches of any suitable type. The two clutches shown are identical in construction and are similarly numbered except for the distinguishing superscripts "s" and "p" to indicate conventionally that one steers in one direction and the other in the opposite direction. Each clutch comprises an insulating disk $86^s$ or $86^p$ fixed on shaft 81 by means of a hub $87^s$ or $87^p$, two bi-polar electro-magnets $88^s$ or $88^p$ mounted on said disk, slip rings $89^s$ or $89^p$ and $91^s$ or $91^p$ on the outer face of said disk, with corresponding brushes $92^s$ or $92^p$ and $93^s$ or $93^p$ contacting respective slip rings for conducting current to and from the magnet windings. The pole pieces of the magnet are presented to a machined surface on the rear and near the periphery of the corresponding gear 85. The resilience of the disks is sufficient to carry the pole pieces out of contact with the gear when the electro-magnets are deenergized, and the structure illustrated has been found to have adequate driving power and to give quick and complete release. Obviously the shaft can be left at rest or turned in either direction by selective energization of the two clutches.

Shaft 81 drives a parallel shaft 94 by means of speed reducing gears 95, 96. The shaft 94 turns in bearings 97 and carries the spool or drum 98 for the tiller rope, (not shown).

It is customary in motor boats to use such a drum, the rope making several turns around the drum, so that when the drum turns it pays out on one side the amount it takes up on the other. This rope is connected at its ends to the tiller. No novelty is here claimed for such arrangement, and in fact various known equivalents, suited to particular installations are within common knowledge and mechanical skill. Hence the connections to the rudder need not be illustrated.

Each of the contacts 43 represents a definite angular deviation from the true course, and the steering engine includes a follow-up device to ensure that the more sharply the boat deviates from the true course, the greater the corrective setting of the steering gear. This mechanism will now be described.

A gear 99 is fixed on shaft 94. This gear has a wide toothed face, and meshes with a much narrower rack 101, mounted on the upper edge of a slider 102, so that as the gear turns back and forth, the slider moves longitudinally in reverse directions. The slider is guided by a channel guide member 103 which is laterally shiftable. As such lateral shifting is primarily an adjustment to set the device to the steering characteristics of a particular boat it is not frequently made. It suffices, therefore, to provide a series of holes 104 to receive screws 105 which hold the channel guide 103.

The slider 102 is of insulating material and has a longitudinal slot or aperture 106, which carries on its lower margin two longitudinal contact strips $107^s$ and $107^p$, one connected to each winding $88^s$ or $88^p$, respectively. These contacts nearly, but not quite, meet at the middle, leaving a gap 108 of such form and width that it can never be bridged by one of the brush wires 109 now to be described. There is one brush wire 109 for each contact 43 in the compass, and the brush wires are mounted in splayed arrangement as shown, so that their effective spacing may be changed by shifting the guide 103 laterally as above explained. One end of each wire 109 is bent down and inserted in a hole formed in the insulating block 111 to receive it. The other end is bent down and dips freely into a corresponding mercury cup 112 formed in the insulating block 113. Thus the brush is free to exert good contact pressure on the contacts $107^p$ and $107^s$.

As has already been suggested, the winding 46 is periodically excited. A convenient way of doing this is to drive a make and break switch from a constantly running shaft 73, though any suitable drive might be used. Pulleys 115, 116 and belt 117 drive shaft 118 at a suitable reduced speed. Shaft 118 carries eccentric 119 which through eccentric strap 121 rocks a lever 122 pivoted at 123 on bracket 124. Lever 122 carries a mercury switch comprising a sealed glass chamber 125 containing two contacts 126, 127, and a quantity of mercury 128, which alternately submerges and exposes the contacts 126, 127 (see Fig. 12) as the lever 122 rocks.

While there is one brush wire 109 for each contact 43 and while each successive contact is normally connected to a corresponding one of the brush wires seriatim, such an arrangement must be subject to ready variation to meet particular weather conditions, increasing the response of the steering engine to meet heavy weather conditions. For this purpose there is provided the switch mechanism shown in Figs. 8–11. This comprises a body 131 having one row of mercury wells 132, one for each contact 43, and another row of mercury wells 133, one for brush wire 109. A connector plate 134 carries two rows of pins 135 and 136 which dip into wells 132 and 133 respectively. Figs. 8 and 9 show the connector plate for calm weather in place. In this each pin 135 is connected to the opposite pin 136, so that wells 132 of one row are connected to opposed wells 133 of the other row.

Fig. 10 shows a connector plate for rough weather in which certain pins 136 are omitted, and the connections from the pins 135 are splayed out so that the steering motor moves farther for a given deviation of the boat from her course.

Fig. 11 shows a connector plate for a heavy following sea. Here all the pins 136 except the middle (true course) pin and the two end (hard over) pins are omitted. All the pins 135 on either side of the middle pin 135, are connected to the corresponding end pin 136. Thus if the boat deviates from the true course the motor turns the rudder continuously until the deviation is corrected or until the helm is hard over. In this way the steering gear functions to check the yawing tendency encountered with following seas.

Referring now to the wiring diagram, Fig. 12, the battery 141 represents any source of electrical energy, controlled by switch 142. The battery, under the control of the switch furnishes current for three parallel circuits.

The first circuit is the motor drive circuit and is by way of wire 143 to motor 72 and return by wire 144.

The second is by wire 145 to winding 46, wire 146 to contact 126, mercury contactor 128, contact 127 and wire 147. This is the periodic circuit that excites winding 46 to raise and lower contactor 65.

The third circuit is the clutch control circuit, and is by way of wire 145, core 48, armature 66, contactor 65 to any selected contact 43. As an alternative arrangement the portion of the circuit above traced might be from wire 145 to 44 acting as a contact (as indicated by dotted lines at 148), thence through 65 to the selected contact 43. In the latter case there would be no connection of 145 to core 48.

The two arrangements are substantial equivalents except that the first gives a quick break by the spring action of contactor 65 which flexes to allow armature 66 to engage core 48. Each contact 43 has an independent wire connection 149 to a corresponding mercury well 132. Each opposed mercury well 133 has a wire connection 151 to a corresponding one of the brush wires 109 via mercury wells 112. Some one brush wire 109 is always in the gap 108 between contacts 107$^s$ and 107$^p$; the remaining brush wires engage one or the other of the contacts 107$^s$, 107$^p$. Contact 107$^p$ is connected by brush 93$^p$, slip ring 91$^p$, magnet winding 88$^p$, slip ring 89$^p$, brush 92$^p$ to wire 152 and contact 107$^s$ is similarly connected to wire 152 via brush 93$^s$, slip ring 91$^s$, magnet winding 88$^s$, slip ring 89$^s$ and brush 92$^s$. Wire 152 connects to battery through return wire 144.

Assume that a boat equipped with such a device is under way in calm or moderate weather conditions. The contactor plate 134 of Fig. 8 is put in place, the boat is put on the desired course, the ring 35 is oriented until the middle contact 43 is over the end of contactor 65 and the switch 142 is closed. This starts motor 72 and causes winding 46 to be periodically energized.

The number of cycles per minute comprising the alternate energization and deenergization of the winding 46 is dependent on the rapidity with which the boat will turn, for the contact 65, when lifted, permits only limited motion of the compass card, and the actual motion of the card must be kept safely within this limit to avoid positive interference with the compass. A thirty eight foot cabin cruiser has been steered successfully using about 80 cycles per minute in which the periods of energization were three to four times the intervening inert periods. With larger slower-turning boats it may be found desirable to lower the number of cycles and increase the time ratio of energization to deenergization.

If at the time the switch 142 is closed the rudder is straight, the middle brush wire 109 will be in the gap 108 between contacts 107$^s$ and 107$^p$ and both magnetic clutches will remain deenergized as contactor 65 closes against the middle contact 43. If the rudder is not straight one clutch will engage periodically until the rudder is turned straight and the gap 108 comes under the middle brush wire. If the contactor 65 engages contacts 43 to either side of the middle contact, the rudder will be turned a corresponding amount. For example, if the contactor touches the third contact 43 on one or the other side of the middle, the steering engine will move in a corrective direction and then come to rest when the gap 108 arrives under the corresponding, third brush 109 from the middle. More generally stated, when contactor 65 closes against any contact 43 the steering engine moves until the clutch energizing circuit is broken at that particular brush wire 109 which is electrically connected with that contact 43. Thus the rudder responds in direction and degree to departures from the set course.

The course may be changed by orienting the ring 35, thus changing the relations of contacts 43 to the lubber line. If the ring 35 be turned at a moderate rate, the change in course may be made while the automatic steering device is in operation.

Lateral adjustment of guide 103 obviously changes the effective spacing of the brush wires 109 and thus affects the amount the steering engine (and hence the rudder) will move to correct a given departure from the true course. As different boats respond differently to given amounts of helm and as steering gear ratios also vary, this adjustment is convenient in adapting a more or less standardized steering unit to different boats. It can also be used to vary the response of any particular boat to suit the preferences of the operator.

The contact plates 134 are interchanged to give different steering characteristics to suit changing weather. In effect the plates, for heavy weather, drop out certain of the brush wires 109 by disconnecting them, and connect widely spaced brush wires seriatim to closely spaced contacts 43 near the middle contact, thus radically increasing rudder response. Fig. 10 shows what is in effect a 2 to 1 increase in response in the first and second contacts to either side of the middle. Fig. 11 shows a contactor which tends to put the helm hard over to correct a one contact deviation from the true course. This will prevent yawing of more than slight amplitude and hold the boat on her course in a following sea.

The spherical chamber in the compass being centered at the center of tilt, virtually eliminates the tendency of the liquid to rotate as it would occasionally do otherwise when the boat rolls with a circular motion. This is an occurrence familiar to users of compasses and at times causes the card to rotate or to swing away from its true position.

While the mechanism has been described in considerable detail, the described embodiment is illustrative. The novel features disclosed may be used alone or in analogous combinations, and generally substitutions may be made within the scope of the invention.

What is claimed is,—

1. The combination of an indicating member rotatable about an axis; a resilient contactor member rotatable about its middle on a concentric axis and shiftable in the direction of such axis; stop members with which the ends of said contactor member engage when moved in one such axial direction, at least one of said members serving as a contact; inclined positioning guides reacting between said members arranged to permit limited relative rotary motion of the members when the contactor engages said stop members, and progressively to limit such relative motion to zero as the contactor moves in the reverse direction; a combined armature and contact mounted at the middle of said contactor member, a combined electro-magnet and contact mounted adjacent said combined armature and contact, the parts being so dimensioned that said contactor member is flexed when said combined armature and contactor closes against said combined electro-magnet and contact; and means for alternately exciting and deenergizing said electro-magnet.

2. A device for transmitting electrically the indications of a compass, comprising the combination of a case; a rotatable compass element mounted on a normally vertical axis in said case; a normally horizontal contact element supported by said case; a contactor shiftable in the direction of the axis of said compass element to move into and out of contact with the contact element;

an alining guide structure interposed between said contactor and said movable compass element, said guide structure having inclined surfaces which free the contactor from the compass when the former engages the contact element, and aline the contactor relatively to the compass element when the contactor shifts in the reverse direction; means for shifting the contactor alternately in reverse directions; and means for adjusting said guide structure.

3. A device for transmitting electrically the indications of a compass, comprising the combination of a case; a rotatable compass element mounted on a normally vertical axis in said case; a normally horizontal contact element supported by said case; a contactor shiftable in the direction of the axis of said compass element to move into and out of contact with the contact element; an alining guide structure interposed between said contactor and said movable compass element, said guide structure having inclined surfaces which free the contactor from the compass when the former engages the contact element, and aline the contactor relatively to the compass element when the contactor shifts in the reverse direction; means for shifting the contactor alternately in reverse directions; and adjustable weights for balancing said compass element.

4. A device for transmitting electrically the indications of a compass, comprising the combination of a case; a rotatable compass element mounted on a normally vertical axis in said case; a normally horizontal contact element supported by said case; a contactor shiftable in the direction of the axis of said compass element to move into and out of contact with the contact element; an alining guide structure interposed between said contactor and said movable compass element, said guide structure having inclined surfaces which free the contactor from the compass when the former engages the contact element, and aline the contactor relatively to the compass element when the contactor shifts in the reverse direction; means for shifting the contactor alternately in reverse directions; means for adjusting said guide structure; and adjustable weights for balancing said compass element.

5. The combination of an indicating device having an indicating member guided in a definite path; a contactor member movable in an adjacent similar path, and shiftable transversely to said path toward and from said indicating member; a support adjustable in a third and adjacent path and carrying contact means with which said contactor member coacts when shifted transversely in one direction; oblique guiding means, interposed between said members, arranged to allow limited relative motion of said members when the contactor member engages said contact means, and progressively to reduce such range of motion to zero as the contactor member moves away from said contact means; and means for periodically shifting said contactor member in such transverse directions.

6. The combination of a rotatable indicating member; a support rotatably adjustable on a concentric axis; contact means carried by said support; a contactor member rotatable on a concentric axis and shiftable in the direction of such axis to move into and out of contact with said contact means; an alining guide structure interposed between said members and having inclined surfaces which free the indicator member for limited rotary movement relatively to the contactor member when the latter engages said contact means and position said members relatively to each other when the contactor member shifts in the reverse direction; and means for shifting said contactor in reverse directions.

7. In a compass, the combination of a case; a rotatable compass element mounted on a normally vertical axis in said case; a cover swivelled on said case; an arcuate contact device supported by said cover and concentric with said axis; a contactor rotatable concentrically with said compass element and shiftable in the direction of its axis to move into and out of contact with said contact device; an alining guide structure interposed between said compass element and said contactor, having inclined surfaces which permit limited relative rotation when the contactor engages said contact device, and aline the contactor relatively to the compass element when the contactor shifts in the reverse direction; and means for shifting the contactor alternately in reverse directions.

8. The method of moving a contactor into contact with selected contacts of a series according to the changing indications of a movable indicating member, which consists in shifting the contactor alternately into positioning engagement with the indicating member and out of such engagement into contact with one of a series of contacts selected by such positioning.

9. The method of moving a contactor into contact with selected contacts of a series according to the changing indications of a movable indicating member, which consists in electro-magnetically shifting the contactor alternately into positioning engagement with the indicating member and out of such engagement into contact with a contact of the series selected by such positioning.

10. The method of moving a contactor into contact with selected contacts of a series according to the changing indications of a magnetic compass, which consists in shifting the contactor alternately into positioning engagement with the indicating member and out of such engagement into contact with a contact selected by such positioning, said shifting being effected by variations in a magnetic field to which the magnetic compass is indifferent.

11. A device for transmitting electrically the readings of an indicating device, comprising in combination with such device a commutator having a plurality of insulated contacts; a shiftable contactor member capable of engaging said contacts selectively; means associated with the indicating member of the indicating device arranged to aline said contactor in a definite relation to said indicating member; and means operable to shift said contactor alternately out of contact with the alining means and into contact with selected contacts of said commutator segment and to return the same to said alining means.

12. A device for transmitting electrically the indications of an indicating device, comprising in combination with such device a commutator having a plurality of insulated contacts; a shiftable contactor capable of engaging said contacts selectively; a guide associated with the indicating member arranged to aline said contactor in a definite relation to said indicating member; and electrically actuated means operable to shift said contactor alternately out of contact with selected commutator contacts and into alining engagement with said guide, and out of engagement with said guide into contact with selected commutator contacts.

13. A device for transmitting electrically the indications of a magnetic compass, comprising in combination a magnetic compass; a pivot bearing for said compass; a commutator having a plurality of insulated contacts; an alining support on the movable member of the compass; a contactor member resting on said support and movable therefrom into contacting engagement with the commutator; and means for so shifting said contactor.

14. A device for transmitting electrically the indications of a magnetic compass, comprising in combination a magnetic compass; a pivot bearing for said compass; a commutator having a plurality of insulated contacts; an alining support on the movable member of the compass; a contactor member resting on said support and movable therefrom into contacting engagement with the commutator; an electro-magnet to whose field the compass needle is indifferent, said magnet being arranged to shift said contactor between the two positions named; and means for alternately exciting and deenergizing said electro-magnet.

15. A device for transmitting electrically the indications of a magnetic compass, comprising in combination a magnetic compass; a pivot bearing for said compass; a commutator having a plurality of insulated contacts; an alining support on the magnetic compass adapted to aline a movable contactor element in a direction at right angles to the directional magnetic needles of said compass; a contactor member resting on said support and movable therefrom into contacting engagement with the commutator; and means for shifting said contactor.

16. A device for transmitting electrically the readings of an indicating device, comprising in combination with such device, a commutator having a plurality of contacts insulated from each other; a shiftable contactor capable of engaging said contacts selectively; a guide on the indicating member of the indicating device arranged to aline said contactor when the latter is away from said commutator and to afford clearance for the contactor when the latter is in contact with the commutator so as then to allow motion of the indicating member relatively to the contactor; and means serving to shift said contactor alternately into contact with the commutator and into alining engagement with the guide, the periods of engagement with the commutator being so chosen relatively to the rate of movement of the indicating member and the contactor clearance, that the contactor does not obstruct motion of the indicating member.

17. A device for transmitting electrically the indications of a magnetic compass, comprising in combination a magnetic compass element; a pivot bearing for said element; a commutator having a plurality of insulated contacts; an alining support on the magnetic compass element adapted to aline a movable contactor element in a direction at right angles to the directional magnetic needles of the compass; a contactor member resting on said support and movable therefrom into contacting engagement with the commutator; and means for shifting said contactor.

18. The method of adjusting a contactor element relatively to a contact element to vary their coaction according to changing indications of an indicating member, which consists in shifting the contactor out of positioning engagement with said indicating member, and while in the adjustment determined by such engagement, into engagement with the contact element, and then shifting the contactor out of the last named engagement and then into positioning engagement with the indicating member to readjust it according to the indication of the indicating member, and repeating said operation.

19. The method of adjusting a contactor element relatively to a horizontal arcuate contact element according to changing indications of a horizontally swinging indicating member, which consists in raising the contactor element vertically out of positioning engagement with said indicating member and into contact with said arcuate contact element, then lowering said contactor element into positioning engagement with said indicating member, and repeating the above cycle.

20. The combination with an indicating device having a shaft and an indicating member supported by said shaft, of a contactor member rotatable and longitudinally shiftable on said shaft; inclined positioning guides reacting between said members, arranged to permit relative rotary motion when the members are separated, and to force the contactor member into definite angular relation with the indicating member as they approach each other; a contact member arranged to be engaged by said contactor after the latter has moved away from the indicating member; and means for shifting the contactor member toward and from the indicating member.

21. The combination with an indicating device having a shaft and an indicating member supported by said shaft, of a contactor member rotatable and longitudinally shiftable on said shaft; inclined positioning guides reacting between said members, arranged to permit relative rotary motion when the members are separated, and to force the contactor member into definite angular relation with the indicating member as they approach each other; a contact member arranged to be engaged by said contactor after the latter has moved away from the indicating member; and electro-magnetic means for shifting the contactor member toward and from the indicating member.

22. The combination with an indicating device having an indicating member guided in a definite path, of a contactor member movable in an adjacent similar path and shiftable transversely to said path toward and from the indicating member; a contact element which said contactor engages upon transverse motion in one direction; oblique guiding means interposed between said members arranged to allow substantial relative motion when the contactor engages the contact element and progressively to reduce such range of relative motion to zero as the contactor member moves away therefrom; and means for periodically shifting said contactor member in such transverse direction.

23. The combination with an indicating device having an indicating member guided in a definite path, of a contactor member movable in an adjacent similar path and shiftable transversely to said path toward and from the indicating member; a contact element which said contactor engages upon transverse motion in one direction; oblique guiding means interposed between said members arranged to allow substantial relative motion when the contactor engages the contact element and progressively to reduce such range of relative motion to zero as the contactor member moves away therefrom; and electro-magnetic means for periodically shifting said contactor member in such transverse direction.

24. The method of adjusting a contactor element relatively to a contact element to vary their coaction according to changing indications of an indicating member, which consists in establishing a normally active alining tendency between said contactor element and indicating member, and periodically shifting the contactor element into contact with the contact element and thus suspending the alining function during contact and permitting it to occur during the intervals.

BRADFORD B. HOLMES.